UNITED STATES PATENT OFFICE.

LEWIS CHEESEMAN, OF GLENBURN, PENNSYLVANIA, ASSIGNOR TO WITHERBEE, SHERMAN & COMPANY, OF PORT HENRY, NEW YORK, A CORPORATION OF NEW YORK.

FERTILIZER.

1,188,898. Specification of Letters Patent. Patented June 27, 1916.

No Drawing. Original application filed October 25, 1911, Serial No. 656,706. Divided and this application filed August 8, 1913. Serial No. 783,827.

*To all whom it may concern:*

Be it known that I, LEWIS CHEESEMAN, a citizen of the United States, residing at Glenburn, in the county of Lackawanna and State of Pennsylvania, have invented certain new and useful Improvements in Fertilizers; and I do hereby declare the following to be a full, clear, and exact description of the invention, such as will enable others skilled in the art to which it appertains to make and use the same.

My invention consists in certain new and useful improvements in fertilizers and this application is a division of my application, which resulted in U. S. Letters Patent No. 1,076,818, Oct. 28, 1913.

The object of my invention is to produce a fertilizer which will remove acid conditions, sweeten the soil and fertilize the same by indirection, and by the use of which bacterial life favorable to plant growth is accelerated and the bacterial life harmful to plant growth, is diminished or destroyed.

A further object is to produce a fertilizer which while having the effects above described, will at the same time change the physical character of the soil, causing clayey soil to become pulverulent and sandy to soil to become more retentive of moisture, in both cases providing more water, to form a culture medium, during the growing season of plants when, as is well known, the temperature of the soil is most favorable.

When commercial fertilizers are used, the result in an acid condition of the soil, as for example, when sulfate of potassium gives up the basic radical $K_2O$, the acid radical $SO_3$ remains.

When nitrate of sodium is used in the soil, the excess of nitric acid not absorbed by the growing plants, must be fixed by a base or neutralized, also when available phosphates are manufactured by the addition of sulfuric acid to phosphate of calcium, and an excess of sulfuric acid is employed to give the maximum percentage of available phosphoric acid, this sulfuric acid must be neutralized.

Acid conditions have heretofore been neutralized by the alkaline earth base calcium as oxid, hydroxid or carbonate, but by the use of my improved fertilizer, I accomplish this result in a much shorter period of time and in a more positive manner.

My improved fertilizer consists of an alkaline earth base, sulfid of barium or barium as hydrate and sulf-hydrate.

When I use hydrate and sulf-hydrate I form the double molecule from barium sulfid, with the moisture in the soil according to the reaction,

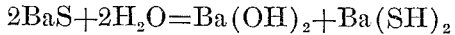

$$2BaS + 2H_2O = Ba(OH)_2 + Ba(SH)_2$$

When using barium sulfid I prefer to add sufficient oxid of calcium or oxid of calcium and water (as hydrate) to gradually convert the barium sulf-hydrate, formed by the moisture in the soil, into barium hydrate according to the reaction,

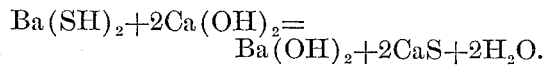

$$Ba(SH)_2 + 2Ca(OH)_2 = Ba(OH)_2 + 2CaS + 2H_2O.$$

I find that when barium hydrate or barium hydrate and sulf-hydrate mixed with hydrate of calcium or its equivalent oxid of calcium, are added to the soil, all acid bodies tend to combine with the barium base, which base is probably one of the most powerful known to inorganic chemistry, forming in many cases, salts insoluble in water.

When barium hydrate or barium hydrate and sulf-hydrate mixed with oxid of calcium, or oxid of calcium with sufficient water to form hydrate of calcium, are added to finely ground phosphate of calcium, the phosphorus is readily taken up or absorbed by the growing plant, as is the case, when the well known substance called "Thomas slag" is employed.

When I use barium sulfid and calcium hydrate I find it advantageous to use substantially the proportions of three hundred and thirty-eight (338) pounds of barium sulfid with one hundred and forty-eight (148) pounds of calcium hydrate, while in using barium sulfid and calcium oxid, the proportions are substantially three hundred and thirty-eight (338) pounds of barium sulfid and one hundred and twelve (112) pounds of calcium oxid.

When I use barium sulfid and lime alone, the direct result is to correct the acidity in the soil, but the indirect result is to allow the plant to take up or absorb the phosphorous, potassium, potash and nitrogen compounds in the soil, thus providing for indirect fertilization.

It is a fact that when acid effects are removed from the soil, including excess of nitrates, and the soil is kept alkaline, nitrification proceeds, and under this condition, both the nitrogen of the air and the nitrogen compounds in the soil, are drawn upon to maintain and nourish plant life. It is also to be noted that when the sulf-hydrate comes in contact with an acid condition in the soil, this sensitive combination gives up sulfur to act as a germicide and as it is more sensitive than a sulfate, such as the sulfate of calcium or potassium, the element sulfur is more quickly available for plant nutrition, which element as ascertained on analysis of plants, is often found in greater amount than either potassium or phosphorous compounds and in some instances more than both the others combined.

It is obvious that my improved fertilizer may be used in connection with any and all materials used for manurial purposes.

What I claim and desire to secure by Letters Patent is:—

1. A fertilizer comprising a basic material containing barium sulfid.

2. A fertilizer comprising among its constitutent parts, barium sulfid and oxid of calcium.

In testimony whereof I affix my signature, in the presence of two witnesses.

LEWIS CHEESEMAN.

Witnesses:
J. E. EDWARDS,
LEWIS CHEESEMAN, Jr.

Copies of this patent may be obtained for five cents each, by addressing the "Commissioner of Patents, Washington, D. C."